United States Patent [19]

Bronder

[11] Patent Number: 4,851,970
[45] Date of Patent: Jul. 25, 1989

[54] SWING-AWAY TAILLIGHT ASSEMBLY

[76] Inventor: David G. Bronder, 1467 Carriage La., Rochester, Mich. 48063

[21] Appl. No.: 203,491

[22] Filed: Jun. 7, 1988

[51] Int. Cl.⁴ .............................................. B60Q 1/06
[52] U.S. Cl. ....................................... 362/66; 362/74; 362/269; 362/372; 362/427; 362/80.1
[58] Field of Search .................. 362/61, 74, 269, 285, 362/287, 372, 249, 250, 362, 418, 427, 66; 340/81 R, 87, 89, 97, 69, 331, 332, 84

[56] References Cited

U.S. PATENT DOCUMENTS

| 1,732,673 | 10/1929 | Coquille . | |
| 2,025,952 | 12/1935 | Levet . | |
| 2,054,919 | 9/1936 | Anibal . | |
| 2,218,442 | 10/1940 | Thurber . | |
| 2,221,178 | 11/1940 | Best . | |
| 2,703,398 | 3/1955 | Harrington et al. | 362/249 |
| 2,736,005 | 2/1956 | Craddock . | |
| 2,772,406 | 11/1956 | Juergens . | |
| 2,891,235 | 6/1959 | Halpert . | |
| 3,175,186 | 3/1965 | Barenyi . | |
| 3,775,607 | 11/1973 | Blomstedt | 362/249 |
| 4,054,789 | 10/1977 | Romanelli . | |
| 4,118,764 | 10/1978 | Bleiweiss et al. | 362/249 |
| 4,190,880 | 2/1980 | Esaki | 362/287 |
| 4,449,167 | 5/1984 | Cohen | 340/87 |
| 4,628,417 | 12/1986 | Kaminski et al. | 362/427 |
| 4,683,521 | 7/1987 | Poleschuk et al. . | |
| 4,731,708 | 3/1988 | Gonas | 340/97 |

OTHER PUBLICATIONS

Advertisement for a Polestar Brake Light Model No. 301 pub. prior to 6/7/88.
Advertisement for Creation Windows "Tri-Lite" Assembly pub. prior to 6/7/88.
Creations "Tri-Lamp" Assembly, No. 90-100-0, copyrighted 1987 for Creation Automotive Products.
Prestige Truck Accessories Three-Way Camper Shell Light, pub. prior to 6/7/88.

Primary Examiner—Ira S. Lazarus
Assistant Examiner—Richard R. Cole
Attorney, Agent, or Firm—Price, Heneveld, Cooper, DeWitt & Litton

[57] ABSTRACT

A taillight assembly for use in a vehicle is provided with a movably mounted housing having a brake light and a viewing light. The housing is movably mounted so as to provide multiple orientations for the viewing light so that different areas may alternatively be illuminated. Also, a light module having a pair of light bulbs is releasably attached to the housing in such a way that either or both of the light bulbs may be replaced in a quick and easy manner without the use of tools.

16 Claims, 3 Drawing Sheets

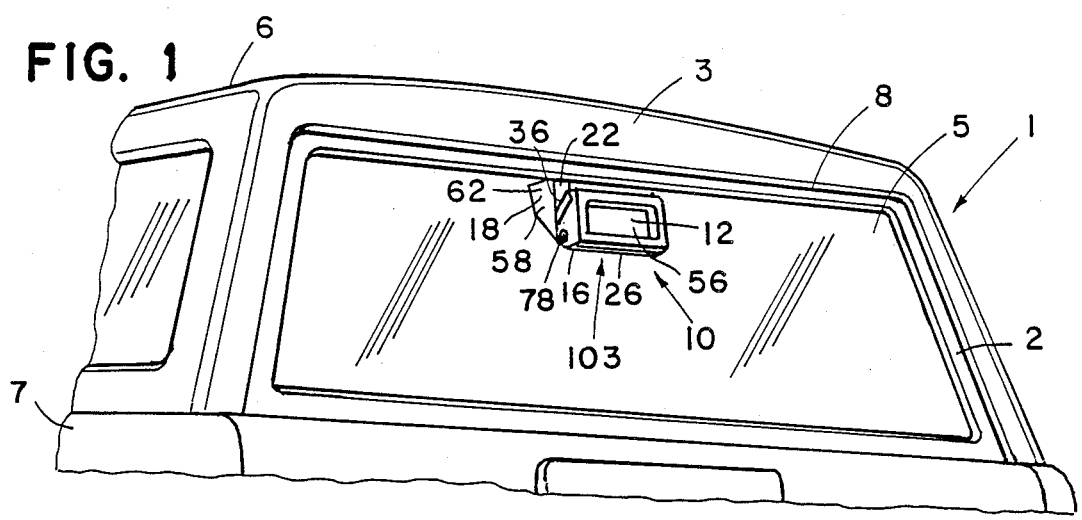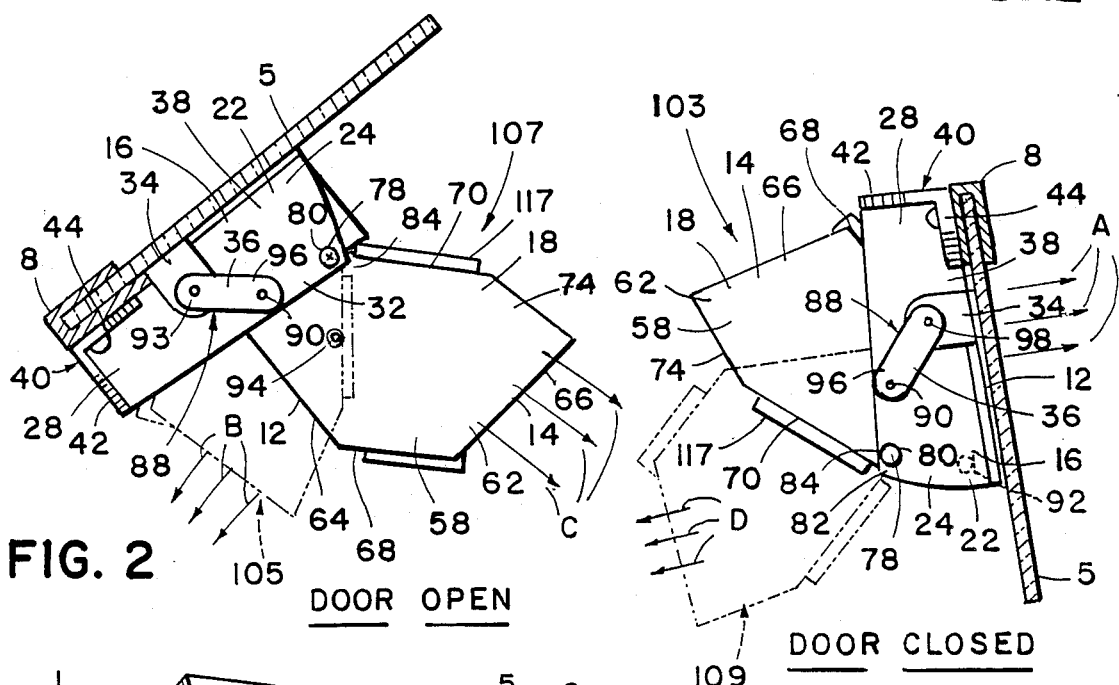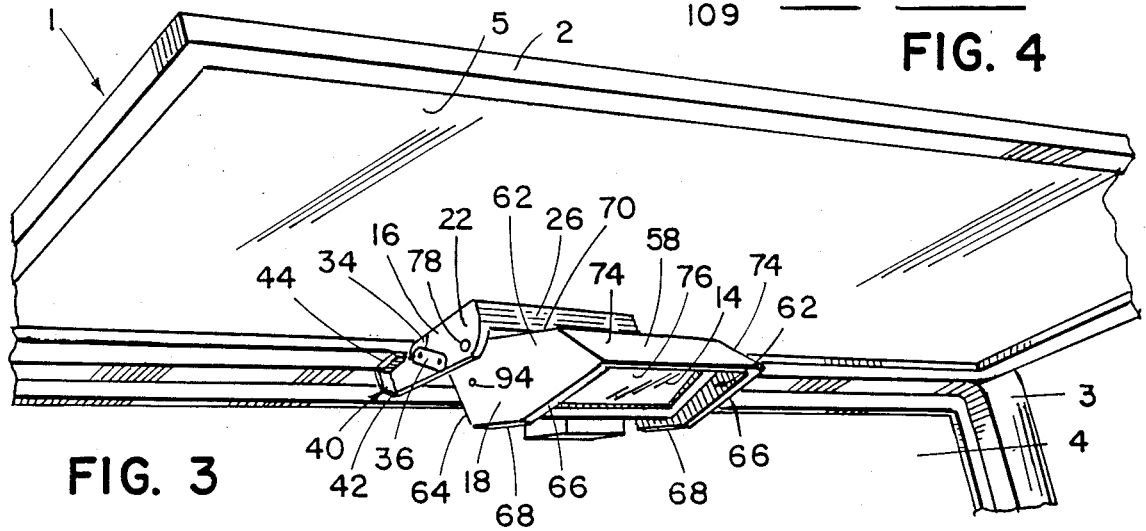

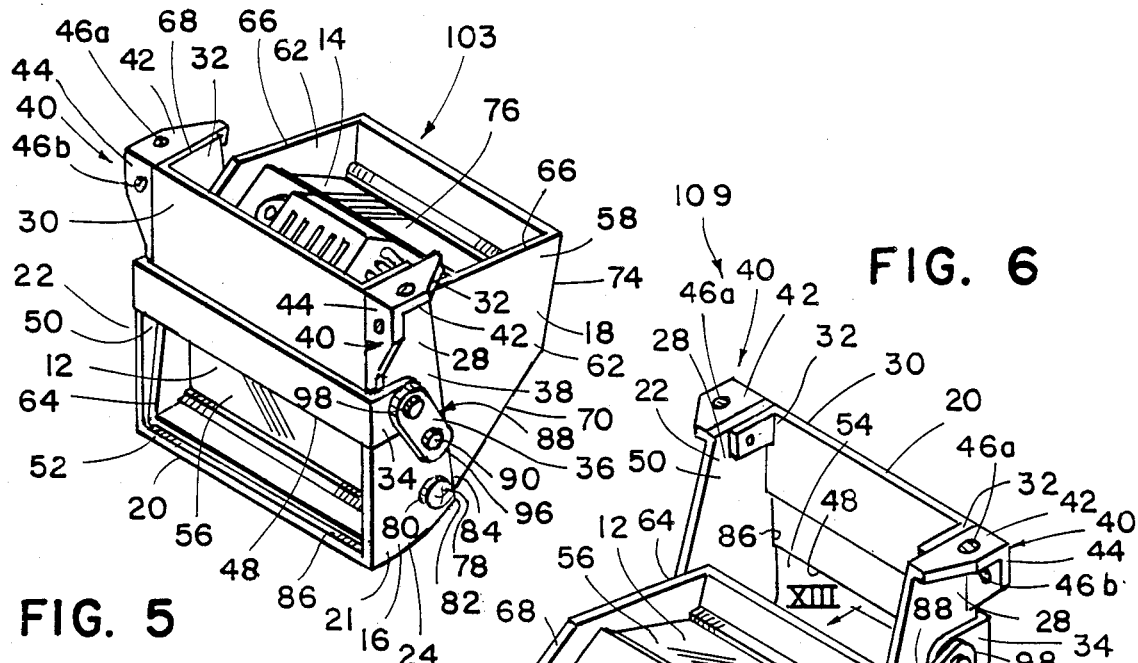
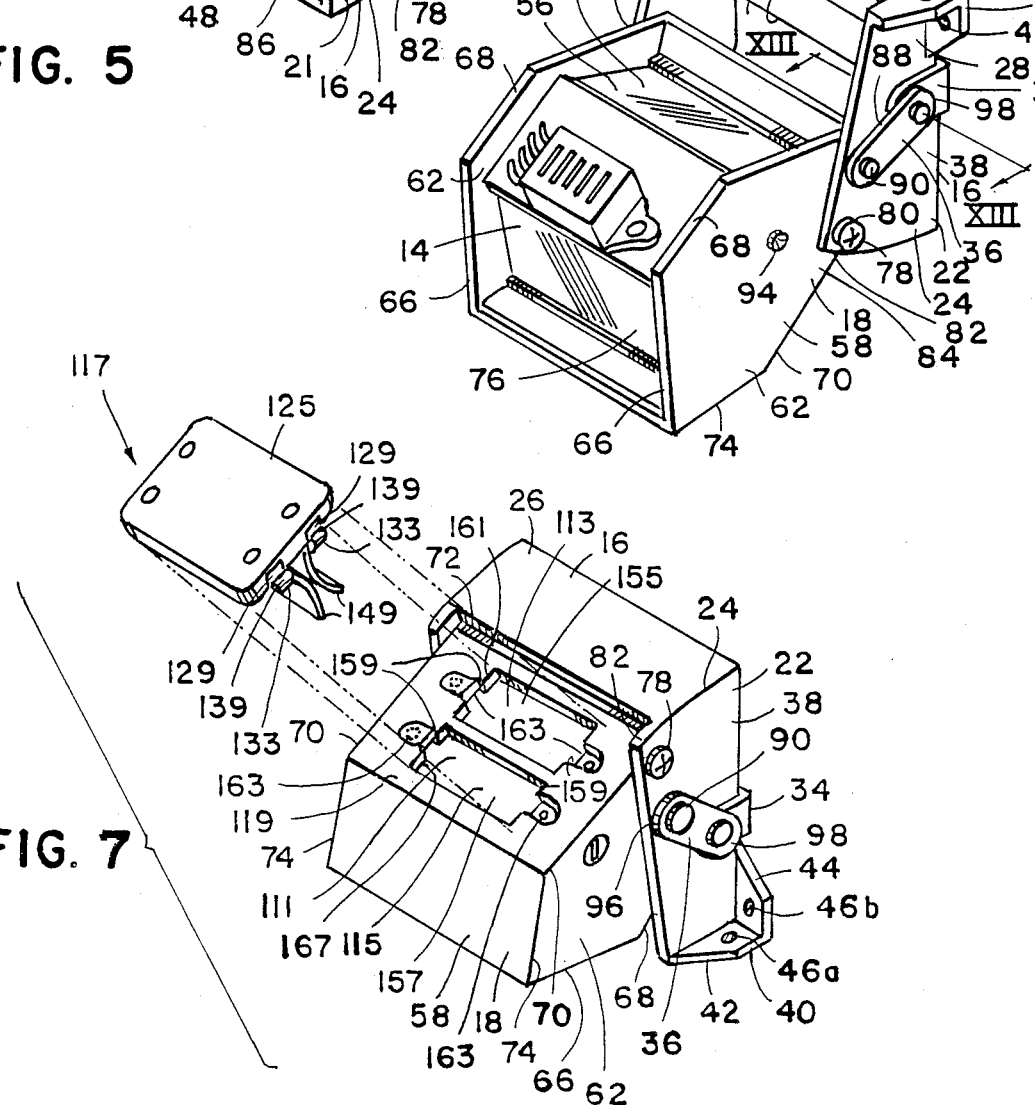
FIG. 5
FIG. 6
FIG. 7

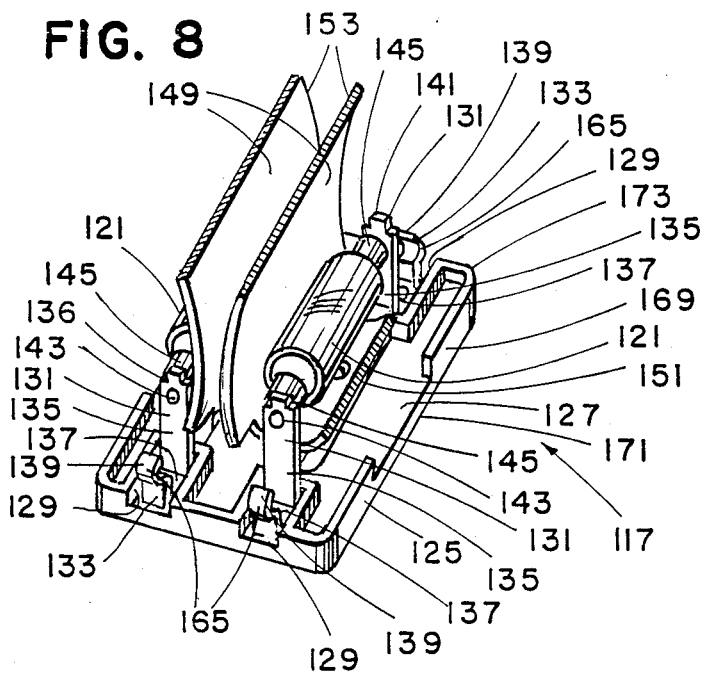
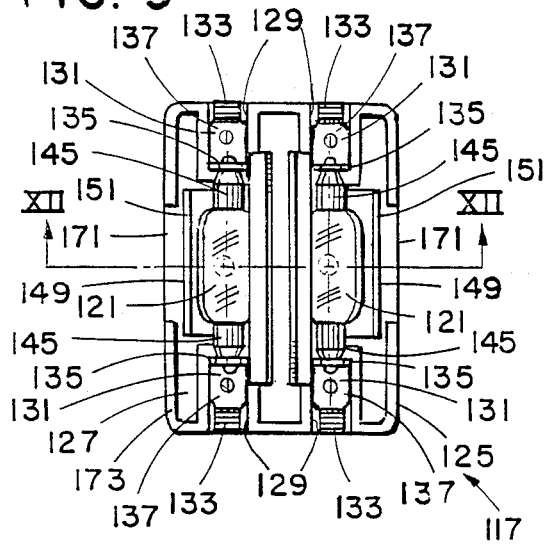
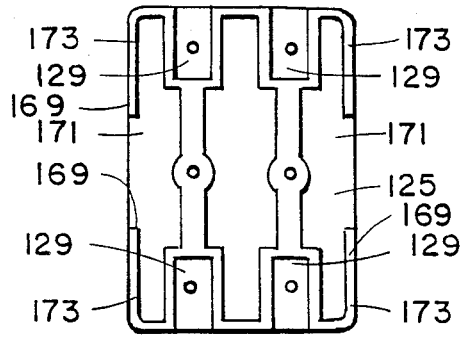
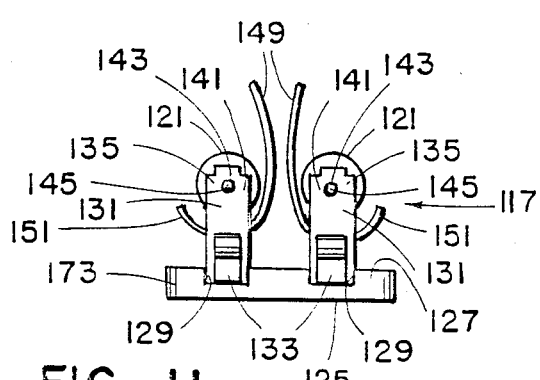
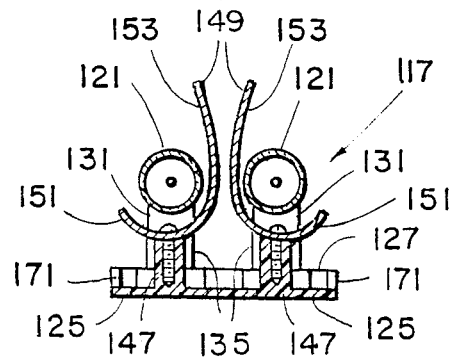

SWING-AWAY TAILLIGHT ASSEMBLY

BACKGROUND OF THE INVENTION

The present invention pertains to vehicle taillight assemblies, and in particular to assemblies providing upper auxiliary brake lights and viewing lights.

The use of upper auxiliary brake lights has become a requirement for all new passenger cars and has become increasingly popular for pickup trucks. Past artisans have designed such taillight assemblies adapted for use with hatchback cars and covered pickup trucks to include not only a brake light but also a viewing light which illuminates the interior of the vehicle. Typically, these light assemblies have been of a block construction having a brake light on the outer side directed to shine outwardly and a viewing light on the inner side directed to shine inwardly.

While past taillight assemblies have added an increased measure of safety due to the provision of the brake light, they have lacked the versatility often needed to make effective use of the viewing light. Moreover, particularly in covered pickup truck applications, the taillight assemblies project downwardly from the swung open rear door and thereby reduce the amount of vertical head space available for loading an item into the bed of a truck.

SUMMARY OF THE INVENTION

In the present invention, a unique taillight assembly is provided which not only includes an upper auxiliary brake light and a viewing light, but also adjustment capabilities incorporated to overcome the aforementioned problems.

The taillight assembly of the present invention entails a two-part construction which includes a mounting structure and a complementary light structure movably attached thereto. The adjustment capabilities of the light structure permit the viewing light to assume multiple positions which include not only illumination of the vehicle's interior, but also illumination of an area outside the rear of the vehicle. This latter orientation of providing an overhead, supported lamp is particularly advantageous in the hitching of a trailer in the dark. Moreover, the adjustable nature of the assembly allows the structures to be oriented such that a minimal amount of vertical head space is lost due to the provision of the taillight assembly.

As a second aspect of the present invention, the taillight assembly includes a light module which is easily inserted and removed from the light structure to facilitate a quick and easy replacement of the light bulbs therein. The module effectuates replacement of the bulbs in one quick and easy movement, regardless of the bulb that needs changing, and without the use of tools.

These and other objects, advantages and features of the present invention will be more fully understood and appreciated by reference to the written specification and appended drawings.

BRIEF DESCRIPTION OF THE DRAWINGS

FIG. 1 is a perspective view of a taillight assembly of the present invention mounted to a cover of a pickup truck;

FIG. 2 is a side elevational view of the taillight assembly in a swung outward orientation on an open rear door shown in full lines, and in an inward orientation shown in phantom;

FIG. 3 is a perspective view of the taillight assembly as oriented in FIG. 2;

FIG. 4 is a side elevational view of the taillight assembly shown in an inward orientation on a closed door in full lines, and in an outward orientation shown in phantom;

FIG. 5 is a front perspective view of the taillight assembly in an inward position;

FIG. 6 is a rear perspective view of the taillight assembly in an outward position;

FIG. 7 is an exploded bottom perspective view of the taillight assembly with the light module removed;

FIG. 8 is a perspective view of a light module of the taillight assembly;

FIG. 9 is a top plan view of the light module;

FIG. 10 is a top plan view of the base of the light module;

FIG. 11 is a side elevational view of the light module;

FIG. 12 is a cross-sectional view taken along line XII—XII in FIG. 9; and

FIG. 13 is a fragmentary cross-sectional view taken along line XIII—XIII in FIG. 6.

DETAILED DESCRIPTION OF THE PREFERRED EMBODIMENT

In the preferred embodiment, taillight assembly 10 having a brake light 12 and a viewing light 14 is adapted to be mounted to the rear door 2 of a covered pickup truck 1 (FIG. 1) or a hatchback vehicle (not shown). Taillight assembly 10 is of a two-part construction having a mounting structure 16 and a light structure 18 movably attached thereto.

More specifically, mounting structure 16 includes an open U-shaped framework 20 having a pair of vertical legs 22 interconnected along their bottom ends 24 by a bight 26 (FIGS. 3, 5 and 7). Preferably, legs 22 and bight 26 are formed as a unitary plastic molded member; however, any known construction could be used. Fixedly attached to and interconnecting top ends 28 of legs 22 is a supporting plate 30 (FIGS. 5 and 6). Plate 30 includes a pair of lateral flanges 32 which are received within legs 22 and riveted (or secured by another known means) to top ends 28 thereof to secure plate 30 in place and provide framework 20 with additional strength to alleviate the risk of breaking or deforming legs 22. Plate 30 further includes a pair of laterally extending ears 34 which are positioned below lateral flanges 32 and are adapted to partially wrap around the outside of legs 22. Ears 34 are provided to mount a pair of indexing plate springs 36, as will be further described below. Preferably, supporting plate 30 is composed of a metallic material, such as steel or aluminum for strength purposes, but other materials possessing the requisite characteristics could also be used.

Also fixedly attached to top ends 28 of legs 22, along outer sides 38 thereof, are a pair of L-shaped mounting flanges 40 (FIGS. 2–7). Each mounting flange 40 includes a horizontal portion 42 and a vertical portion 44 (as oriented with rear door 2 closed, FIGS. 4–6) which are provided with apertures 46a and 46b designed to receive therethrough bolts or other fastening members for securely coupling assembly 10 to rear door 2 of truck cover 3. Mounting flanges 40 are provided with perpendicular portions 42, 44 to facilitate the mounting of assembly 10 to either of the two type of conventional pickup truck bed covers 3. Generally, covers 3 are constructed with either a rear trapezoidal door 2 (as shown in FIG. 1) or an arcuately configured door (not shown). As can be seen in FIGS. 1-4, vertical portions 44 are utilized to secure assembly 10 to a trapezoidal door 2. The arcuate doors are provided with an inwardly extending plate to which horizontal portions 42 may be fixedly attached for mounting assembly 10.

Open framework 20 further defines an opening 54 between lower edge 48 of supporting plate 30 and the inner surfaces 50, 52 of legs 22 and bight 26, respectively (FIGS. 1, 5 and 6). Opening 54 is dimensioned slightly larger than red brake light lens 56 and is adapted to permit brake light 12 to shine therethrough when light structure 18 is oriented in a driving position.

Light structure 18 includes a housing 58 in which is supported brake light 12 and viewing light 14 (FIGS. 3, 5 and 6). More specifically, housing 58 includes a pair of sidewalls 62 which are positioned in a substantially parallel relationship with legs 22. Each sidewall 62 has a substantially trapezoidal configuration defined by front edge 64, rear edge 66 and parallel top and bottom edges 68, 70 (FIGS. 2-7). The trapezoidal configuration is modified by the further inclusion of base edges 72, 74 interconnecting bottom edge 70 with front and rear edges 64, 66, respectively.

Housing 58 supports between sidewalls 62 red brake lens 56 and clear viewing lens 76, which are recessed inwardly of front and rear edges 64, 66, respectively. Lenses 56, 76 are inclined approximately ten degrees to their corresponding adjacent edges 64, 66, and also approximately seventy degrees from one another. These orientations facilitate proper lighting in each distinct position of light structure 18, as will be discussed below.

Housing 58 is pivotally attached to mounting structure 16 to effect the versatile adjustment capabilities of viewing light 14. More specifically, sidewalls 62 are partially received within legs 22 of framework 20. A pair of pivot pins 78 are passed through holes 80, located in rearward lower corners 82 of legs 22, and attached to sidewalls 62 in the corner 84 formed by the intersection of base edge 74 and bottom edge 70. Pins 78 are preferably in the form of bolts threadedly secured to sidewalls 62, but could, of course, be connected in other known ways.

This pivotal arrangement permits light structure 18 to be positioned in either an inward position (FIG. 5) or an outward position (FIG. 6). In the inward position (FIG. 5), sidewalls 62 are received within framework 20 such that front edges 64 are nearly in alignment with bordering edges 86 of opening 54. In the outward position (FIG. 6), light structure 18 is swung outwardly such that sidewalls 62 are almost entirely positioned outside of legs 22. Preferably, in the outward position, front edges 64 project rearwardly substantially normally from legs 22.

This pivotal movement is controlled by an indexing mechanism 88 which positively holds light structure 18 in two distinct positions, one position being shown in FIGS. 1, 2, 5 and 7, and the other in FIGS. 3 and 6. Indexing mechanism 88 is preferably of a detent type having a spring biased peg 90 which is alternatively received within one of a plurality of depressions 92, 94 (FIGS. 2, 4-6 and 13). More specifically, each sidewall 62 is provided with a pair of spaced apart depressions 92, 94 which are radially spaced an equal distance from pivot pin 78. Each peg 90 is alternatively received within depressions 92, 94 on sidewall 62 to lock light structure 18 in either its inward or outward position.

Pegs 90 are spring biased toward sidewalls 62 so that they are naturally received within depressions 92, 94 when aligned therewith. The biasing force is effected by fixedly attaching each peg 90 to the distal end 96 of one plate spring 36. The opposing end 98 thereof is riveted (or secured by another known means) to a lateral ear 34 of supporting plate 30. For additional support, each peg 90 is received through a hole 101 in leg 22 to maintain its proper position so as to ensure alignment with depressions 92, 94. This relieves the stress which would otherwise be created in plate spring 36 and thereby increases the useful life of indexing mechanism 88. Also note that an abutment 99 may be provided on bight 26 (shown only in FIG. 2) to ensure that the light structure 18 is not subjected to over-pivoting and possible damage thereby to the assembly 10.

In use, taillight assembly 10 when mounted on the rear door 2 of a vehicle, is adjustable into four distinct positions which include: (1) a driving position 103 (FIGS. 1 and 4) in which door 2 is closed and the brake light 12 is directed rearwardly along arrows A in full view of following traffic; (2) a doorway position 105 (FIG. 2) in which the door 2 is open and the viewing light 14 illuminates the doorway opening 4 by directing light rays in the direction along arrows B; (3) an exterior position 107 (FIG. 2) in which the door 2 is open and viewing light 14 illuminates an area outside of the vehicle by directing light rays in the direction along arrows C; and (4) an interior position 109 (FIG. 4) in which the door 2 is closed and the viewing light 14 illuminates the interior of the vehicle by projecting its light rays in the direction along arrows D. Thus, four full distinct positions are achieved by providing two positions when rear door 2 is closed and two positions when it is open.

The driving position 103 is effected with rear door 2 closed and assembly 10 folded into a closed compact orientation (FIGS. 1 and 4). In this position 103, brake lens 56 is aligned with opening 54 so as to direct a red light in direction A rearwardly through rear door window 5 upon actuation of brake light 12. Viewing light 14 is inoperable at this point and directed primarily toward the roof 6 of cover 3. With this arrangement, a compact assembly 10 is presented which consumes a minimal amount of available storage space in the truck bed 7.

The doorway position 105 is achieved from the driving position 103 by swinging open rear door 2 about its hinge (not shown) attached along the upper edge 8 thereof. As seen in phantom lines in FIG. 2, viewing light 14 is, without further adjustment, directed downwardly and forwardly along arrows B to brightly light doorway opening 4. Preferably, a mercury switch (not shown) is utilized to automatically light viewing light 14 when placed in this position 105, as well as in the subsequent positions 107, 109. Of course, other known switch arrangements could also be used. By so positioning and actuating viewing light 14, the user realizes a great benefit for nighttime use. The doorway 4 of bed 7 is automatically illuminated without the user encumbering his hands with a flashlight or the like to ease the removal or loading of an item within bed 7.

The exterior position 107 is achieved from the doorway position 105 by swinging light structure 18 outwardly about pin 78 into its open position (full lines of FIG. 2). In this position 107, viewing light 14 is rotated so that it now shines outwardly and downwardly along arrows C to brightly illuminate the area directly rearward of truck 1. This illumination enhances the user's ability to accomplish a great many tasks, and in particular the quick and easy hitching of a trailer. Sufficient light is easily had and supported by merely swinging light structure 18 of the present taillight assembly 10. No longer would the user need to attempt holding a flashlight or balancing it in a proximate location.

Moreover, pickup trucks 1 and hatchback vehicles are particularly desirable for their ability to receive and transport larger items than otherwise would be possible in a conventional vehicle of comparable size. However, taillight assembly 10 in its closed, unadjusted position projects downward from an open rear door 2, and thereby blocks a portion of the vertical head space that is available in the bed 7. Yet, in the exterior position 107, as can be clearly seen in FIG. 2, light structure 18 is swung upwardly and outwardly so that the available vertical head space is increased.

The interior position 109 is effected with rear door 2 closed (FIG. 4). In this position 109, light structure 18 may once again be swung outwardly, to thereby rotate about pin 78, so that viewing light 14 is directed inwardly and slightly downwardly in the direction of arrows D. Such an arrangement enables complete lighting of the interior of truck bed 7. This feature is particularly advantageous for users utilizing their truck bed 7 for camping purposes.

The dual light construction of taillight assembly 10 is of a unique and efficient configuration. More specifically, housing 58 is a hollow shell having an interior wall 111 which extends completely across the interior of housing 58 to thereby define a pair of adjacent, but separate, pockets 113, 115 (FIG. 7). First pocket 113 is formed in part by interior wall 111 and red brake lens 56 opposed thereto to form brake light 12. Likewise, second pocket 115 is formed in part by interior wall 111 and clear viewing lens 76, opposed to the other side thereof, to form viewing light 14.

Cooperating with housing 58 is a light module 117 removably secured to the bottom surface 119 thereof (FIG. 7). Light module 117 snap fits into housing 58 to provide the necessary light source for each of the two lights 12, 14. By fashioning such a light module 117, a user can quickly and easily change either light bulb 121 without the use of tools.

Light module 117 includes a base 125 which preferably is a unitary, molded plastic member (FIGS. 7-12). Base 125 is formed on its inward side 127 with four bordered slots 129, each receiving therein a substantially hook shaped contact 131. Each contact 131 includes an outer upwardly projecting short leg 133, an inner upwardly projecting long leg 135, and an interconnecting mounting strip 137 which is riveted (or secured by another known means) into place in its corresponding slot 129.

Outer leg 133 is configured with an arcuate bowed section 139 which functions to not only ensure electrical contact, but also to mount light module 117 to housing 58, as will be discussed below. Inner leg 135 is shaped with a shallow S-curve to engage and mount a conventional light bulb 121. To facilitate such a mounting, upper ends 141 of opposed inner legs 135 are spaced apart slightly less than the length of bulb 121 so that they are spring biased into gripping relationship with bulb 121 by their own inherent resiliency. Further, to ensure a secure mounting and solid electrical contact, upper ends 141 are provided with a central bore 143 which receives therein the tip 145 of bulb 121.

Beneath each bulb 121 is formed a ridge 147 which is adapted to mount an arcuate reflector element 149. Each reflector 149 has a substantially arcuate hook shaped configuration such that a trough section 151 is situated beneath bulb 121 and an upwardly projecting section 153 extends between bulbs 121. Reflectors 149 are provided to intensify the emitted light passed through lenses 56, 76.

Bottom surface 119 of housing 58 is provided with a pair of rectangular, parallel openings 155, 157 which are spaced apart by the width of interior wall 111. A notch 159 is provided in the two opposite ends of each opening 155, 157. Secured within notches 159 and positioned to wrap around housing wall 161 are complimentary contact elements 163 which are electrically coupled to conventional wiring (not shown).

In the mounting of light module 117 to housing 58, light bulbs 121 are substantially aligned with corresponding openings 155, 157 such that one reflector 149 and light bulb 121 is received on one side of interior wall 111 and into first pocket 113 to form brake light 12, and the other reflector 149 and light bulb 121 is received on the other side of interior wall 111 and into second pocket 115 to form viewing light 14. Light module base 125 is, then, pressed against bottom surface 119 so that outer legs 133 are received within notches 159 and lockingly interengaged with complimentary contact elements 163.

More specifically, bowed sections 139 of legs 133 normally extend outwardly further than notches 159. Consequently, as light module 117 is pressed against bottom surface 119, legs 133 are resiliently forced inwardly as bowed section 139 rides along complimentary contact element 163. Once the complimentary contact element 163 has passed peak 165 of bowed section 139, outer legs 133 snap back outwardly so that bowed section 139 abuts the inner surface 167 of housing wall 161 and securely holds light module 117 in place.

Along each longitudinal side 169 of base 125 is provided a grasping slot 171 formed in the upraised peripheral rim 173 of base 125. Slots 171 are designed to facilitate the grasping of base 125 when light module 117 is mounted to leg structure 18 so that it may be manually removed from openings 155, 157 against the bias of outer legs 133.

Of course, it is understood that the above are merely preferred embodiments of the invention, and that various other embodiments as well as many changes and alternations may be made without departing from the spirit and broader aspects of the invention as defined in the claims.

The embodiments of the invention in which an exclusive property or privilege is claimed are defined as follows.

1. A taillight assembly for use in a vehicle cap comprising a housing movably mounted to the vehicle cap door and having a pair of lights including a brake light and a viewing light; said housing being adjustable to one position where the brake light when said cap door is closed shines rearwardly from the vehicle and said viewing light faces upwardly toward the ceiling and not forwardly of the vehicle; said housing being adjustable to said second position when the cap door is closed in which said second position the viewing light faces rearwardly of said cap door and projects light forwardly of said vehicle into the interior of said cap.

2. The taillight assembly of claim 1 in which said housing is movably attachable to a rear door of the vehicle, such that in said first position when said door is open said viewing light is oriented to illuminate the open doorway of the vehicle, and in said second position when said door is open said viewing light is oriented to illuminate an area outside of the vehicle.

3. The taillight assembly of claim 2 in which said housing in said second position is positioned upwardly of its position in said first position, whereby a greater vertical head space is thereby provided for loading an item into the vehicle through the rear door.

4. The taillight assembly of claim 2 in which said movable attachment of the housing to the door includes a mounting structure fixedly attachable to the rear door of the vehicle, and in which said housing is releasably locked alternatively into said positions through a detent locking mechanism operably acting between said mounting structure and said housing.

5. The taillight assembly of claim 4 in which said detent locking mechanism includes a spring biased peg movably attached to one of said housing and said mounting structure, and a pair of depressions, adapted to receive said peg when aligned therewith, formed in the other of said housing and said mounting structure.

6. The taillight assembly of claim 5 further including at least one mounting flange, fixed to said mounting structure, having a pair of orthogonal portions each with an aperture therethrough, whereby said taillight assembly is adapted to mount to either type of two conventional rear doors of a pickup truck cover.

7. The taillight assembly of claim 5 further including a light module releasably attached to said housing and having a pair of light bulbs which are received within said housing such that one said bulb acts as the brake light and the other said bulb acts as the viewing light.

8. The taillight assembly of claim 7 in which said housing further includes a hollow shell divided along its midsection by an interior wall into two separate pockets and a pair of openings in said housing, wherein one said opening provides access to one of said pockets and said other opening provides access to the other of said pockets, wherein said light module releasably attaches to said housing such that said one light bulb is passed through one opening and into one said pocket to form said brake light and said other light bulb is passed through said other opening and into said other pocket to form said viewing light.

9. The taillight assembly of claim 1 in which the housing is mounted to the vehicle cap door by at least one mounting flange having a pair of orthogonal portions each with an aperture therethrough, whereby said taillight assembly is adapted to mount to either type of two conventional rear doors of a pickup truck cover.

10. The taillight assembly of claim 1 further including a light module, releasably attached to said housing, having a pair of light bulbs which are received within said housing such that one said bulb acts as the brake light and the other said bulb acts as the viewing light.

11. The taillight assembly of claim 10 in which said housing further includes a hollow shell divided along its midsection by an interior wall into two separate pockets and a pair of openings in said housing, wherein one said opening provides access to one of said pockets and said other opening provides access to one other of said pockets, wherein said light module releasably attaches to said housing such that said one light bulb is passed through one opening and into one said pocket to form said brake light and said other light bulb is passed through said other opening and into said other pocket to form said viewing light.

12. A taillight assembly for use in a vehicle comprising a housing movably mounted to the vehicle and having a pair of lights including a brake light and a viewing light, said brake light being positionable to shine rearwardly from the vehicle and said viewing light being positionable into multiple orientations to thereby provide adjustable illumination of different areas; means for pivotally coupling said housing to a rear door of the vehicle, whereby said housing is positionable into first and second positions relative to the rear door wherein when the rear door is open said first position orients said viewing light to illuminate the open doorway of the vehicle and said second position orients said viewing light to illuminate an area outside the vehicle; and wherein when the rear door is closed said first position orients said brake light to shine rearwardly from the vehicle whereby it may be viewed from behind the vehicle when actuated and said second position orients said viewing light to illuminate the interior of the vehicle; said movable attachment of the housing to the door including a mounting structure fixedly attachable to the rear door of the vehicle, and in which said housing is releasably locked alternatively into said positions through a detent locking mechanism operably acting between said mounting structure and said housing; said detent locking mechanism including a spring biased peg movably attached to one of said housing and said mounting structure, and a pair of depressions, adapted to receive said peg when aligned therewith, formed in the other of said housing and said mounting structure; a light module releasably attached to said housing and having a pair of light bulbs which are received within said housing such that one said bulb acts as the brake light and the other said bulb acts as the viewing light; said light module further including a plurality of resilient contact members operably coupled to said light bulbs and said housing further includes a plurality of notches having complementary contact elements positioned therein, said light module being releasably attached to said housing by said contact members which are received within said notches and resiliently biased against said contact elements in a gripping relation.

13. A taillight assembly for use in a vehicle comprising a housing movably mounted to the vehicle and having a pair of lights including a brake light and a viewing light, said brake light being positionable to shine rearwardly from the vehicle and said viewing light being positionable into multiple orientations to thereby provide adjustable illumination of different areas; a light module, releasably attached to said housing, having a pair of light bulbs which are received within said housing such that one said bulb acts as the brake light and the other said bulb acts as the viewing light; said housing further including a hollow shell divided along its midsection by an interior wall into two separate pockets and a pair of openings in said housing, wherein one said opening provides access to one of said pockets and said other opening provides access to the other of said pockets, wherein said light module releasably attaches to said housing such that said one light bulb is passed through one opening and into one said pocket to form said brake light and said other light bulb is passed through said other opening and into said other pocket to form said viewing light; said light module further including a plurality of resilient contact members operably coupled to said light bulbs and said housing further including a plurality of notches having complementary contact elements positioned therein, said light module being releasably attached to said housing by said contact members which are received within said notches and resiliently biased against said contact elements in a gripping relation.

14. A light assembly comprising:
a housing including a hollow shell divided by an interior wall into two separate pockets, each said pocket having along one side thereof a non-opaque lens adapted for permitting the passage of light therethrough, said housing further including a pair of openings wherein one said opening provides access to one of said pockets and said other opening provides access to the other of said pockets, and electrical contact elements positioned in each opening; and
a light module having a pair of light bulbs and a plurality of electrical contact members operably coupled to said light bulbs, said light module being releasably attached to said housing such that one of said light bulbs is passed through one of said openings and into one of said pockets to form a first light and the other of said light bulbs is passed through the other of said openings and into the other of said pockets to form a second light, and such that said contact members engage said contact elements to form an electrical connection facilitating actuation of said light bulbs, whereby either or both of said light bulbs may be easily replaced by simply removing said light module from said assembly; said electrical contact members being resilient and providing an outwardly biasing force against said contact elements to thereby releasably hold said light module to said housing, whereby either or both of said light bulbs may be quickly and easily replaced without the use of tools.

15. The light assembly of claim 14 in which the contact members have a substantially hook-like configuration which includes resilient outer legs adapted to engage and releasably grip said contact elements, resilient inner legs adapted to engage and releasably hold said light bulbs, and an intermediate bight portion fixed to a base of said light module.

16. The light assembly of claim 14 in which said housing further includes a plurality of notches along the periphery of said openings, wherein said electrical contact elements are positioned within said notches, and wherein said contact members are received within said notches for engagement with said contact elements, whereby said notches function to restrict the lateral movement of said contact members and thereby maintain said light module in a proper orientation on said housing.

* * * * *